United States Patent [19]

Taramasso et al.

[11] 4,431,621

[45] Feb. 14, 1984

[54] METHOD FOR PREPARING ALUMINUM-SILICATE HAVING A ZEOLITE-LIKE STRUCTURE

[75] Inventors: Marco Taramasso, San Donato Milanese; Giovanni Perego, Milan; Bruno Notari, San Donato Milanese, all of Italy

[73] Assignee: Snamprogetti S.p.A., Milan, Italy

[21] Appl. No.: 407,055

[22] Filed: Aug. 11, 1982

Related U.S. Application Data

[63] Continuation of Ser. No. 215,175, Dec. 11, 1980, abandoned.

[30] Foreign Application Priority Data

Mar. 13, 1980 [IT] Italy ............................... 20557 A/80

[51] Int. Cl.$^3$ .............................................. C01B 33/28
[52] U.S. Cl. .................................... 423/329; 423/328; 502/77 D
[58] Field of Search .............................. 423/328, 329; 252/455 Z; 260/448 C

[56] References Cited

U.S. PATENT DOCUMENTS

| | | | |
|---|---|---|---|
| 3,313,594 | 4/1967 | Wilson | 423/329 |
| 3,516,786 | 6/1970 | Maher et al. | 423/329 |
| 3,676,063 | 7/1972 | Elo et al. | 423/329 |
| 4,175,114 | 11/1979 | Plank et al. | 423/329 |
| 4,242,233 | 12/1980 | Ball et al. | 423/329 |

FOREIGN PATENT DOCUMENTS

| | | | |
|---|---|---|---|
| 1553209 | 9/1979 | United Kingdom | 423/329 |
| 2018232 | 10/1979 | United Kingdom | 423/329 |

OTHER PUBLICATIONS

Wolf et al., "Zeitschrift fur Chemie", 13 Jg. 1973, pp. 109-110.
Charnell, "J. Crystal Growth", 8 (1971), pp. 291-293.

*Primary Examiner*—Edward J. Meros
*Assistant Examiner*—Jackson Leeds
*Attorney, Agent, or Firm*—Ralph M. Watson

[57] ABSTRACT

An improved process is disclosed for producing alumino-silicates having a porous structure, of the zeolite class, the process essentially comprising the step of preparing a homogeneous aqueous mixture containing a source of alumina, a source of silica and alkali metal bases and/or alkaline earth metal bases, the improvement consisting in adding to said mixture at least one substance which contains at least a hydroxyl group in its molecule. The advantages are that the use of nitrogenous organic substances, universally used heretofore for the preparation of certain zeolites, can be dispensed with inasmuch as the alkali metal ion is capable, alone, of displaying the counter-ion function.

1 Claim, No Drawings

METHOD FOR PREPARING ALUMINUM-SILICATE HAVING A ZEOLITE-LIKE STRUCTURE

This is a continuation of application Ser. No. 215,175, filed Dec. 11, 1980, now abandoned.

This invention relates to a method for the preparation of aluminum-silicates having a zeolite-like structure.

Alkylammonium, or nitrogenous, zeolites are known (Breck, D. W., "Zeolite Molecular Sieves", John Wiley & Sons, N.Y., 1974, pages 304–312): these are obtained by hydrothermal crystallization of a mixture of silica and alumina hydrogels in the presence of a nitrogenous organic base, such as alkylammonium compounds, or their precursors: also alkali metal ions may be present in such a system.

The nitrogenous organic compounds fulfil two important requirements, viz.:

priming the formation of the zeolite cavities (template action) and acting in a sort of scaffolding action to provide a skeleton about which the $SiO_4^-$ and $AlO_4$ tetrahedra take an orderly spatial arrangement, and acting as a counter-ion, by balacing the negative charge which is originated due to the Al-Si substitutive possibility.

Among the zeolites of the kind referred to above, which are characterized, as a rule, by high Si:Al ratios, those designated by the symbol ZSM can be quoted.

On account of their quite particular structure and porosity, such zeolites exhibit specific catalytic activities for chemical reactions of outstanding industrial importance, such as alkylations, isomerizations, and the production of synthetic fuels.

The zeolite called ZSM 5 (U.S. Pat. No. 3,702,886) is known, which is obtained by using tetrapropylammonium derivatives. Other zeolites are likewise known, with nitrogenous organic bases, among which:
Zeolite ZSM-11 (U.S. Pat. No. 3,709,979)
Zeolite ZSM-12 (U.S. Pat. No. 3,832,449)
Zeolite ZSM-35 (U.S. Pat. No. 4,016,245)
Zeolite "beta" (U.S. Pat. No. 3,308,069)

When, conversely, the zeolites are prepared without any organic base being present, that is to say, in the presence of inorganic cations only, it is not possible to obtain zeolites having the properties of those referred to above.

The zeolites prepared with inorganic cations only are materials of the types Linde A, Faujasite X and Y, Mordenite and the like, which are characterized by an Si:Al ratio comprised between 1 and 5. Such zeolites exhibit very different properties from each other and are used for dehydration, cation-exchange and catalytic cracking reactions.

It has now been found, quite surprisingly, that it is possible to obtain alkylammonium-type zeolites by hydrothermal crystallization of hydrogels of silica and alumina which contain inorganic bases only, by having recourse to organic substances which contain hydroxyl functions, such as alcohols and phenols, and more particularly glycols, polyglycols (mol wt over 400), and polyhydroxyl substances, or substances which evolve hydroxyl or polyhydroxyl compounds.

The meaning of this fact is that, contrary to the teachings of the prior and contemporary art, it is no longer necessary, for preparing such zeolites, to resort to nitrogenous organic substances having a basic character (organic cations or precursors thereof) to which there had been exclusively attributed heretofore the privilege of promoting the formation of the zeolite cavities.

When operating in accordance with the teachings of this invention, the counter-ion function is fulfilled, quite in a surprising way, by the alkali metal ion only and exclusively. Matter-of-factly, the experiences which have been made have shown that, in the end product, the alkali metal cation:Al ratio is close to 1.

Alkaline earth metal ions can likewise be exploited; in such a case, the ratio of the alkaline earth metal cation to aluminum is near 0.5.

The adoption of substances which contain the hydroxyl function is a considerable advance in the process for manufacturing these zeolites, due to the low cost, the absence of toxicity and the lesser pollution hazards as possessed by the product which contain the hydroxyl functions as compared with the nitrogenous organic bases.

Another advantage stemming from the use of a material possessing the hydroxyl function is the improved ease of removal of the fraction of organic product which, upon crystallization with the hydrothermal procedure, is left occluded in the zeolite channels: this is a definite improvement over the methods using nitrogenous organic bases. With these latter, in fact, carbonization is necessary and the complete removal of the organic phases is achieved only after firing in air during many hours, such as 16 hours or more, at 450° C.–550° C.

With the organic hydroxylated products used according to the present invention, the removal, even taking place in dependence of the molecular weight of the substance concerned, can be started from 120° C. and takes place without any decompositions, so that the substance can be recovered and recycled.

The method according to the present invention for producing zeolites contemplates the preparation of a homogeneous aqueous mixture consisting of a silica source and an alumina source and alkali metal bases, or alkaline earth metal bases, to which at least one organic substance is added, which contains at least one hydroxyl function.

The atomic ratio aluminum:alkali metal must not be less than 1.

The mixture in question is subjected to a a hydrothermal processing run at autogenous, i.e. self generated, pressure, at a temperature comprised between 100° C. and 200° C. and for a time variable from 2 days to 6 weeks.

On completion of such a treatment, a crystalline product is obtained, which is withdrawn from the liquid phase, carefully leached with water and dried. The dried product can be fired as such at the temperature of 250° C., or, as an alternative, it can be subjected to cation-exchange with ammonium acetate (or $NH_4$-nitrate), according to the conventional routine. During progress of this operation, the hydroxylated product passes into the aqueous phase, wherefrom it can be recovered. On completion of this step, the zeolite contains the ammonium cation and can be converted, by firing, into the protonic form.

By way of mere orientation and without any limitation to the exemplary ranges, the preferred molar ratios for the reactants are:

|  | Wide Range | Preferred Range |
| --- | --- | --- |
| $SiO_2:Al_2O_3$ | 5-500 | 15-80 |
| $OH^-:SiO_2$ | 0-0.6 | 0.01-0.4 |
| $R.OH:SiO_2$ | 0.02-5 | 0.4-2 |
| $Me^+:SiO_2$ | 0.01-2 | 0.1-0.9 | wherein:

$OH^-$ are the hydroxyls of the alkali metal hydroxide; R.OH indicates the hydroxylated organic substance; $Me^+$ stands for the alkali metal cation (or alkaline earth metal cation.

For the reasons set forth above of economy and/or low toxicity, among the substances having the hydroxyl function, the preferred ones are, alone or in admixture, ethylene glycol, propanediols, butanediols, pentanediols, hexanediols, diethylene glycol, triethyleneglycol, polyethylene glycols, polypropylene glycols, glycerol, inositol, phenolmannitol and polyphenols, such as hydroquinone.

A few examples will now be given hereinafter to illustrate the invention without limitation.

EXAMPLE 1

This example illustrates the synthesis of a zeolite having a high Si:Al ratio, by using glycerol (1,2,3-propanetriol) as the agent for promoting the formation of the zeolite cavities.

In a Pyrex-glass vessel equipped with a stirrer and placed in an atmosphere devoid of carbon dioxide, there are placed 24 g (grams) of $Al(NO_3)_3.9H_2O$, dissolved in 200 g of anh. ethanol, whereafter there are added, with stirring, 240 g of tetraethylorthosilicate. As the solution becomes clear, that which takes 30 mins. approx., there are added 45 g of glycerol and, immediately thereafter, 1,500 g of distilled water. There is added now, with vigorous stirring, a solution of 23 g of NaOH in 500 g of water: a homogeneous gel is formed shortly thereafter. Heat is then administered, the temperature being gradually raised from the ambient value up to 90° C. during a period of 24 hours, with constant stirring. At this stage, the reaction mixture, which has a pH 11.1, is transferred into a stainless steel autoclave equipped with a stirring mechanism and the hydrothermal run is started: it is effected by maintaining the temperature at 175° C. for eight (8) days, with stirring and under the self-generated or autogenous pressure. On completion of this treatment, the mixture is cooled to room temperature and the crystalline product thus obtained is collected on a filter, washed many a time with dist. water at about 80° C. and is eventually dried at 120° C.

The chemical composition of the thusly obtained product denounces the presence of organic substances and water, which are driven off by firing in air at 350° C. during 12 hours.

The product as obtained on completion of firing analyzes:

$Al_2O_3$: 6.2% on a weight basis
$Na_2O$: 2.9% on a weight basis

The product is converted into the protonic form by the conventional routine of repeated exchanges in hot conditions (95° C.) with ammonium acetate (or nitrate) and subsequent firing at 550° C. for 6 hours.

The testing of the zeolite in its protonic form has given the following results:

Chemical analysis: $Al_2O_3 = 6.0\%$ by wt—$Na_2O = 0.02\%$ by wt

Superficial area: (B.E.T. Method, with $N_2$) = 380 $m^2/g$ (square meters per gram)

Volume of the pores: (determ. with $O_2$) = 0.17 $cm^3/g$ (cubic centimeters per gram)

The X-ray diffraction spectrum is identical with that reported for zeolites conventionally indicated as ZSM-5 as shown in Table 1 of U.S. Pat. No. 3,702,886).

EXAMPLE 2

This example is illustrative of the possibility of obtaining different zeolite structures by exploiting the same hydroxylated substance which originates the formation of the zeolite cavities, but appropriately varying the compositions of the reactants and/or the operative conditions.

In point of fact, in the instant example a zeolite is obtained, which is conventionally designated as ZSM-35, by using glycerol as in Example 1 hereof.

With the same procedure as detailed in the previous example, a solution of 4 g of NaOH and 109 g of $NaAlO_2$ (42% by wt of $Al_2O_3$, 31% by wt $Na_2O$, and 27% by wt $H_2O$) in 800 g of water, is supplemented with 736 g of glycerol. On completion of the dissolution, there are added 1200 g of Ludox A.S. 40% colloidal silica and the mixture is heated, with stirring, to 80° C. for 6 hours.

The reaction mixture (pH 12.0) is now transferred into a stainless-steel autoclave equipped with a stirrer for the hydrothermal run at 190° C. for a duration of 6 days.

On completion of this stage, the mixture is allowed to cool, and the as formed crystalline product is collected on a filter, washed and dried.

The chemical analysis of the product which has been obtained has given the following results:

$Al_2O_3 = 9.15\%$ by wt and $Na_2O = 5.87\%$ by wt

The X-ray diffraction pattern corresponds to that reported for the zeolite ZSM-35 (U.S. Pat. No. 4,107,195, Table 1).

The product, converted into its protonic form with the routine described in Example 1 hereof, but omitting the previous firing, that is, upon drying at 120° C., analyzed, upon calcination:

$Al_2O_3 = 9.84$ by wt—$Na_2O = 0.13\%$ by wt

EXAMPLE 3

This example illustrates the use, as the substance which encourages the formation of the zeolite cavities, of a bivalent alcohol, that is, 1,2-propanediol.

With the same procedures, reactants and amounts of the latter as described in Example 1 hereof, but with the only difference of replacing the 45 g of glycerol by 45 g of 1,2-propanediol, a crystalline product has been obtained, which had the same structure as ZSM-5.

The product analyzes:

Product, as such: $Al_2O_3 = 4.7\%$ by wt and $Na_2O = 2.6\%$ by wt

Product, in $H^+$ form: $Al_2O_3 = 4.7\%$ by wt—$Na_2O = 0.05\%$ by wt

EXAMPLE 4

This example illustrates the synthesis of zeolites by means of polyglycols: in the case in point, the substance which is used for causing the formation of the zeolite cavities is triethylene glycol.

With the same procedures as in Example 1 hereof, 24 g of Al(NO$_3$)$_3$.9H$_2$O, dissolved in 200 g of ethanol, are reacted with 240 g of tetraethylorthosilicate, whereafter 90 g of triethylene glycol, 1,500 g of distilled water and eventually 23 g of NaOH are added thereto. The reaction mixture (pH 11.1) is now subjected to the subsequent treatments as outlined in Example 1 hereof.

The crystalline product which is thus obtained, when examined for its X-ray pattern, shows that it is the zeolite designated as ZSM-5, the X-ray diffraction pattern of which is reported on Table 1 of the U.S. Pat. No. 3,702,886.

The chemical analysis has given the following data:
Product, as such: Al$_2$O$_3$=5.5% by wt—Na$_2$O=3.0% by wt Product, in H$^+$ form: Al$_2$O$_3$=6.1% by wt—Na$_2$O=0.01% by wt

EXAMPLE 5

This example is illustrative of the synthesis of a zeolite by using, as the substance which originates the formation of the zeolite cavities, a naphthenic hydroxylated derivative, that is to say, 1,4-dimethoxycyclohexane (1,4-cyclohexanedimethanol), having the following formula:

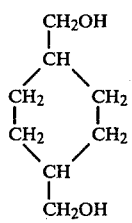

With the same procedure as in Example 4 hereof, a solution of 12 g of NaOH and 12 g of NaAlO$_2$ (42% by wt of Al$_2$O$_3$, 31% by wt of Na$_2$O and 27% by wt of H$_2$O) in 250 g of water is supplemented with 140 g of 1,4-cyclohexanedimethanol. Upon dissolution, there are added 300 g of Ludox AS 40% colloidal silica and heat is administered with stirring at 90° C. for six (6) hours.

The reaction mixture, which has a pH 12.8, is transferred into an autoclave for the hydrothermal run at 145° C. for a time of nine (9) days.

The thusly obtained product thus obtained, after the further steps as described in the previous examples is subjected to X-ray analysis and proved to be a ZSM-5 zeolite with traces of Mordenite.

EXAMPLE 6

By using the same procedures and reactants as in the previous examples hereof and replacing the 140 g of cyclohexanedimethanol by 140 g of inositol and carrying out the hydrothermal run at 180° C. for a time of ten (10) days, there has been obtained, on completion of the operations described herein, the zeolite designated as ZMS-5 in admixture with scanty quantities of Mordenite.

EXAMPLE 7

This example illustrates the synthesis of a zeolite by using as the substance which determines the formation of the zeolite cavities a hydroxylated derivative having the phenolic function, and exactly hydroquinone.

With the same routine as in Example 1 hereof, there are dissolved 24 g of Al(NO$_3$)$_3$.9H$_2$O in 200 g of anh. ethanol, wherefater there are added 240 g of tetraethylorthosilicate. As the solution becomes clear, there are added thereto 60 g of hydroquinone and immediately afterwards 42 g of NaOH dissolved in 200 g of water.

The final mixture, having a pH 10.5, is transferred into an autoclave and maintained therein at 180° C. for twelve (12) days. The product which has been obtained after the steps described herein has been analyzed for its X-ray diffraction pattern and has proved to be a ZSM-5 zeolite.

From the examples reported in the foregoing, it is extremely interesting the fact that the exchange operation for obtaining the protonic formation is now feasible, according to the invention, without any previous firing, contrary to what is conversely required when the organic phases suggested by the prior art are used.

This fact is a clear indication of the circumstance that the bonds with the inorganic matrix are different in the case in which the organic bases according to the prior art are used and in the case in which the organic compounds having hydroxyl functions are conversely used according to the teachings of this invention.

We claim:
1. The process for producing aluminosilicates of the zeolite type having a SiO$_2$/Al$_2$O$_3$ molar ratio in the range of from 15 to 80, wherein the improvement consists in preparing a homogeneous mixture, free from nitrogenous base, comprising a source of silica, a source of alumina, alkali metal ions and hydroquinone and then subjecting said mixture to hydrothermal treatment in the temperature range of from 100° to 200° C. for a period in the range of from 2 days to 6 weeks.

* * * * *